July 4, 1933.  W. H. McADAMS  1,916,325
METHOD OF CONTROLLING RECYCLING OF EXHAUST GAS IN INTERNAL COMBUSTION ENGINES
Filed June 23, 1930

INVENTOR
William H. McAdams
BY Frank L. Belknap
ATTORNEY

Patented July 4, 1933

1,916,325

UNITED STATES PATENT OFFICE

WILLIAM H. McADAMS, OF BROOKLINE, MASSACHUSETTS, ASSIGNOR TO UNIVERSAL OIL PRODUCTS COMPANY, OF CHICAGO, ILLINOIS, A CORPORATION OF SOUTH DAKOTA

METHOD OF CONTROLLING RECYCLING OF EXHAUST GAS IN INTERNAL COMBUSTION ENGINES

Application filed June 23, 1930. Serial No. 462,997.

This invention relates to a method and apparatus for recycling exhaust gases to internal combustion engines for the improvement of combustion conditions in internal combustion engines, and to the power output and operating characteristics of such engines, and more particularly refers to the controlled recycling of exhaust gases to the internal combustion engine to accomplish this purpose.

Among the special features of the present invention is the use of an automatic device for controlling the ratio or proportions between the combustible mixture and the exhaust gases to be returned.

I have discovered that recirculation of exhaust gases is accompanied both by benefits and by evils, and that unless these benefits and evils are fully appreciated, and the amount of gases recirculated is properly regulated, the evils will far outweigh the benefits and the use of recirculation will be defeated. However, by carefully controlling the amount of flue gas recirculated, one obtains maximum benefits and minimum evils. As the proportion of the total exhaust gas recycled to the inlet manifold is increased, the temperature of the resulting mixture of air, gasoline and recycled exhaust gas increases, thus increasing the percentage of the fuel vaporized. This is a desirable feature in that the mixture in the manifold becomes more homogeneous, and there is a better opportunity for each cylinder to be fed with oxygen and hydrocarbons in the proper proportions, also minimizing the evil of crank case dilution. On the other hand, the presence of the recirculated exhaust gas in the mixture entering the cylinder serves as a diluent and from this point of view cuts down the fuel input to the cylinders. Furthermore, during the compression stroke, power is required to compress the exhaust gas and all the power so consumed would not be recovered in useful form during the expansion stroke, hence from this point of view the presence of the exhaust gas is detrimental. Furthermore, as the amount of exhaust gas recycled is increased, the combustion tends to be suppressed, causing a decreased efficiency in the use of the fuel. In recirculating the proper proportion of exhaust gas I obtain the benefits mentioned, increasing the percent vaporization of the fuel entering the cylinders, and obtaining a more homogeneous charge to each cylinder, thereby securing the desirable ratio of oxygen to fuel, at the same time not recirculating sufficient exhaust gas to obtain to any serious extent the evils mentioned above.

When operating under these conditions I find that the tendency of the fuel to knock is noticeably reduced and the merit of this feature is becoming of increased importance. The reduction or elimination of knocking in an automotive engine is particularly useful in hill climbing and in acceleration or whenever the engine is otherwise subjected to heavy loads, all of which tend to promote knocking unless some measures are used to offset this condition, such as the shifting of gears into a lower speed when hill climbing with consequent reduction in rate of acceleration. Furthermore, the power output and efficiency increase as a direct function of the compression pressures and compression ratios within the cylinders, and the reduction of knocking permits design for higher pressures. When recycling the proper proportion of exhaust gas, within certain limits, due to better combustion conditions, the fuel consumption per horse-power-hour or per ton-mile is reduced.

Ordinarily when an engine is started, especially in cold weather, only a small portion of the fuel is vaporized during the period required to warm up the engine, hence operation is for a time erratic and the cumulative effect results in a prolonged warming-up during which crank-case dilution, excessive carbon deposition in the cylinders and other evils attendant to improper fuel vaporization are facilitated. While my device gives no assistance in obtaining the initial explosion in starting, it does effect better vaporization of the fuel after the initial explosion, thus assisting the engine to reach normal operating conditions quickly and obviating the detrimental effects of improper fuel vaporization.

The amount of exhaust gas to be recirculated in starting in cold weather is greater than is desirable under normal operating conditions after the engine warms up. Hence to secure best results under all conditions the proportion of exhaust gas recirculated must be varied from time to time. To accomplish the purpose set forth, the use of an automatic control is disclosed.

From the above, it will be clear that many forms of automatic controls could be used for carrying out the process of my invention and, as illustrations, two forms are described.

The operation of the process of my invention will be best understood by referring to the accompanying drawing in which.

Figure 1:
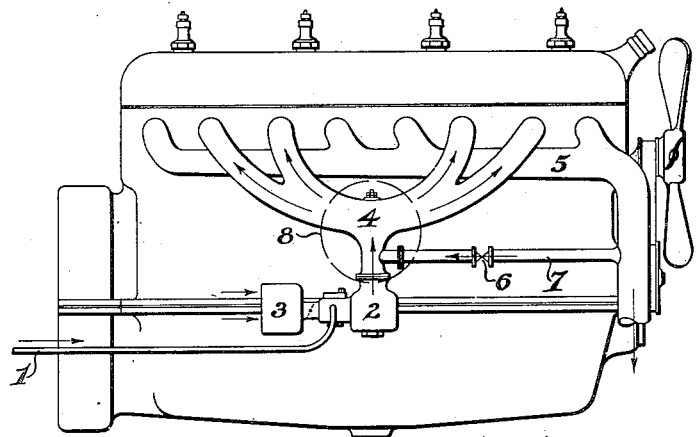
Fig. 1 is a diagrammatic side elevation, not to scale, of an internal combustion engine showing the general features of my invention.

Referring to Fig. 1, the gasoline feed enters carburetor 2 through line 1, the air entering at 3, which may be a filter. The air-fuel mixture leaving the carburetor enters the intake manifold 4, being distributed to the cylinders by the branches shown. The exhaust gases from the cylinders leave through the exhaust manifold 5. A portion of these exhaust gases pass through line 7 controlled by a butterfly, needle or like valve diagrammatically shown at 6, which valve may, if desired, be manually controlled from the dashboard of the motor vehicle. The diverted exhaust gases enter the intake manifold 4 through a control device which, in this case, is within that portion of the intake manifold encircled at 8. Two of the many various forms which this control device may assume are illustrated in Figs. 2 and 3.

Figure 2:
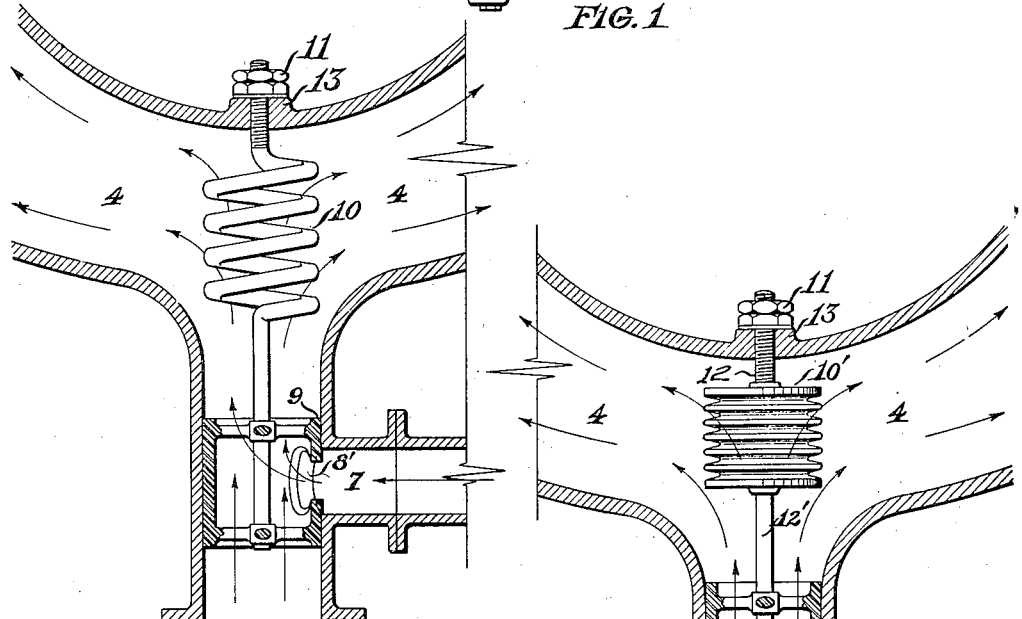
Fig. 2 is a view partly in section of one form of control mechanism.
Figure 3:
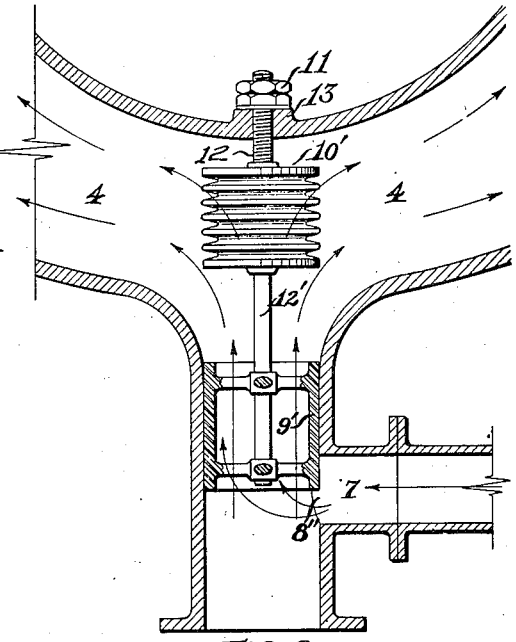
Fig. 3 is a view partly in section of a modified form of control mechanism.

Referring to Fig. 2, the exhaust gases flowing through line 7 pass through the opening 8' in sleeve valve 9 into the manifold 4. In order definitely to control the amount of exhaust gases entering the cylinder relative to the fuel and air mixture, advantage is taken of the temperature of the mixture of air, fuel, and exhaust gases, which determines the rate of flow according to the present method of control.

The increase or decrease in the temperature of the mixture entering the manifold causes an expansion or contraction of coil spring 10, one end of which passes through the wall of manifold 4 at a point 13 and is held firmly in place by the adjustable locking device 11. The spring may be hollow and gas filled, responding readily to temperature changes. Solid metallic or bi-metallic springs with a high coefficient of expansion will also serve the purpose.

Increase of the amount of air-fuel mixture with a constant supply of exhaust gas causes a decrease in the temperature of the mixture of air, fuel, and exhaust gas. This will cause spring 10 to contract, which will operate the valve 9 causing it to turn, thus more fully opening port 8', permitting the entrance of more exhaust gas and maintaining a constant proportion of air and fuel on the one hand, to exhaust gas on the other. Likewise, as the air-fuel mixture is decreased, the temperature around the control element is increased, causing an expansion of spring 10, which more nearly closes port 8', reducing the amount of exhaust gas entering and maintaining a definite ratio of air and fuel to exhaust gas.

Fig. 3 represents, another form of automatic-control device which can be used in my invention, the exhaust gas passing through line 7 enters through port 8'', the opening through which is controlled by slide valve 9' actuated by bellows 10' through movable connecting rod 12'. Another rod 12, which is ordinarily stationary but may be adjusted to various stationary positions, is connected to the opposite end of bellows 10', passes through the wall of the intake manifold 4 at point 13 and is held in place by adjustable locking device 11.

As the air-fuel mixture is increased, the temperature around the control element is decreased, causing a contraction of the bellows 10' and opening the port 8'' by raising the slide valve 9', thus admitting a sufficiently greater amount of exhaust gases to bring the temperature of the mixture back to normal and maintain a substantially constant proportion between the air-fuel mixture and the recycled exhaust gases.

As an example of one of the benefits of the invention, the following data, obtained on well known four cylinder engines, are cited. Per brake horse-power hour, with no recirculation of exhaust gas, 1.25 pounds of gasoline were consumed, whereas with 7% of the total exhaust gas recycled, only 1.09 pounds were required. When 11% of the total exhaust gas was recycled the fuel consumption rose to 1.30 pounds per brake horse-power hour. Obviously, the proper amount of exhaust gas to be recycled will vary somewhat for different motors and as different fuels are employed, but adjustments can be made by means of valve 6 and the adjustable locking devices 11. It will be clear to those skilled in the art that those parts of the control device which are in contact with exhaust gas at high temperatures should be made of a metal not subject to corrosion or scaling.

The examples shown are purely illustrative and I may depart therefrom without departing from the broad scope and spirit of the invention.

I claim as my invention:

1. A method for improving the efficiency of internal combustion engines comprising recycling predetermined portions of the exhaust gases from the exhaust manifold of the engine to the intake manifold, physically commingling the recycled portions of the exhaust gases with the fuel mixture being admitted to the internal combustion engine, and controlling the quantity of exhaust gases commingled in response to the thermal condition of the resultant mixture.

2. A method for improving the efficiency of internal combustion engines comprising recycling predetermined portions of the exhaust gases from the exhaust manifold of the engine to the intake manifold and physically commingling the recycled portions of the exhaust gases with the fuel mixture being admitted to the internal combustion engine, and automatically varying the quantity of exhaust gases commingled with the fuel mixture in response to the thermal condition of the fuel mixture.

In testimony whereof I affix my signature.

WILLIAM H. McADAMS.